(12) United States Patent
Sir

(10) Patent No.: US 8,740,234 B2
(45) Date of Patent: Jun. 3, 2014

(54) SUSPENSION OF VEHICLE WHEEL FOR ROUGH TERRAIN DRIVING

(75) Inventor: Miroslav Sir, Liberec (CZ)

(73) Assignee: Technicka Univerzita V Liberci (CZ)

( * ) Notice: Subject to any disclaimer, the term of this patent is extended or adjusted under 35 U.S.C. 154(b) by 0 days.

(21) Appl. No.: 13/382,589

(22) PCT Filed: Jul. 9, 2010

(86) PCT No.: PCT/CZ2010/000076
§ 371 (c)(1),
(2), (4) Date: Jan. 6, 2012

(87) PCT Pub. No.: WO2011/003371
PCT Pub. Date: Jan. 13, 2011

(65) Prior Publication Data
US 2012/0119465 A1    May 17, 2012

(30) Foreign Application Priority Data
Jul. 9, 2009   (CZ) .................................. 2009-440

(51) Int. Cl.
*B60G 9/00* (2006.01)
(52) U.S. Cl.
USPC .................................................. 280/124.179
(58) Field of Classification Search
USPC ........ 280/124.179, 124.134, 124.135, 124.12
See application file for complete search history.

(56) References Cited

U.S. PATENT DOCUMENTS

| | | | |
|---|---|---|---|
| 1,290,293 A | 1/1919 | Morski | |
| 2,131,661 A * | 9/1938 | Heyermans et al. | ... 280/124.136 |
| 1,993,705 A | 7/1961 | D'Avigdor | |
| 3,400,947 A * | 9/1968 | Cottrill | ..................... 280/86.751 |
| 3,721,457 A | 3/1973 | Tracy et al. | |
| 6,142,495 A | 11/2000 | Kim | |
| 6,161,853 A * | 12/2000 | Jung | ..................... 280/124.136 |
| 7,392,998 B2 | 7/2008 | Runkel | |
| 2003/0122341 A1 | 7/2003 | Smith et al. | |

FOREIGN PATENT DOCUMENTS

| | | |
|---|---|---|
| DE | 19853642 A1 | 5/1999 |
| DE | 20209120 | 10/2003 |
| GB | 132310 A | 9/1919 |

OTHER PUBLICATIONS

International Search Report dated Jan. 17, 2011, issued in corresponding international application No. PCT/CZ2010/000076.

\* cited by examiner

*Primary Examiner* — Faye M. Fleming
(74) *Attorney, Agent, or Firm* — Ostrolenk Faber LLP

(57) ABSTRACT

The present disclosure relates to the suspension (1, 6, 7, 8, 9) of the wheel (3) of vehicle, especially of vehicle for rough terrain driving, including the helical spring (11, 65, 71, 81, 91) arranged between two members of suspension (1, 6, 7, 8, 9) of the wheel (3). Hereat one end of the spring (11, 65, 71, 81) is coupled with moveable member (2) of suspension (1, 6, 7, 8) of the wheel (3), and the second end of spring (11, 65, 71, 81) is coupled with the controlled member (102) of rolling kinematic couple, whose rolling surface engages with convex rolling surface (5) of controlling member (101) of rolling kinematic couple, which is mounted on the basic member (4) of suspension (1, 6, 7, 8) of the wheel (3). Or one end of the spring (91) is coupled with the basic member (4) of suspension (9) of the wheel (3), and the second end of the spring (91) is coupled with the controlled member (102) of rolling kinematic couple, whose rolling surface engages with convex rolling surface (5) of the controlling member (101) of the rolling kinematic couple, which is mounted on the moveable member (2) of suspension (9) of the wheel (3).

20 Claims, 7 Drawing Sheets

SUSPENSION OF VEHICLE WHEEL FOR ROUGH TERRAIN DRIVING

CROSS REFERENCE TO RELATED APPLICATIONS

The present application is a 35 U.S.C. §371 National Phase conversion of PCT/CZ2010/000076, filed Jul. 9, 2010, which claims benefit of Czech Application No. PV 2009-440, filed Jul. 9, 2009, the disclosure of which is incorporated herein by reference. The PCT International Application was published in the English language.

TECHNICAL FIELD

The invention relates to the suspension of a vehicle wheel, especially of a vehicle for rough terrain driving, comprising a helical spring arranged between two members of a wheel suspension.

BACKGROUND ART

The wheels of wheeled vehicles are mounted towards the vehicle chassis on suspensions, whose task is to provide for the vehicle a support towards the driving surface, which enables a spring supported and simultaneously damped mounting of the spring loaded section of the vehicle on the terrain, and with regard to the driving wheel, the suspensions secure a transmission of the driving force to the driving surface.

Each suspension is formed of a kinematic system of rigid bodies, which ensures a definite guidance of the wheel toward the vehicle chassis, and of spring and damping means, which ensure a dynamic transmission of force reaction induced between the driving surface and the travelling wheel on the vehicle chassis. There exists a great number of kinematic schemes in suspension of wheels. The currently used suspensions, for example parallelogram, trapezoidal, telescopic (McPherson), pendulous, crank, and angle suspensions, are characterized by both positive and negative specific characteristics. The basic requirement is minimum changes in geometry of the undercarriage at springing action, i.e. at a deflection of the suspension from the nominal position. The changes in geometry are mostly the changes in wheel gauge and in wheel base and the change in position of the side plane of the wheel with respect to the vertical longitudinal symmetry plane of vehicle.

For vehicles designated for driving on roads the change of these parameters is small, which is given by low values of expected springing action. Minor driving surface irregularity does not require the application of spring and damping means allowing large displacements, where the extreme positions of suspensions towards the vehicle chassis are defined by means of bumpy stops.

Another situation exists for vehicles destined for operation outside roads in a free terrain, where a great travel in suspension is one of the basic required characteristics of the vehicle undercarriage. The geometry of kinematic arrangements of the known types of suspensions by itself enables great travel without problems. The limiting elements in this section of the undercarriage are the spring of the suspension and the shock absorber of the suspension, quite frequently these means being integrated into the spring and damping unit.

Extreme positions of the axle are illustrated on an example of a crank suspension of a rear rigid axle being suspended by means of a central spring and damping unit mounted in a vertical longitudinal symmetry plane of a terrain vehicle (FIGS. 1a, 1b). It is apparent that the working travel of the spring, as limited by its extreme positions, is very short by which it restricts the wheel travel. Such an arrangement is practically not applicable for an off-road vehicle.

In principle, the background art proposes two solutions to this problem.

The first design, at the same positioning of the lower end of the spring and damping unit on the crank of the suspension, utilizes a longer spring with a greater number of coils. Having not changed the diameter of the wire and the spring, its rigidity is reduced while at the same time a greater travel is enabled. Nevertheless the long spring is unstable in a side direction, which complicates the stress on the spring and reduces the spring life. Simultaneously, mounting of an upper end of the long spring and damping unit causes structural problems from the point of view of space requirements.

The second solution utilizes a short spring. In this case it is necessary to transfer the connection of the lower end of the spring and damping unit to the crank of the suspension closer to the axis of crank rotation. In this case the stress on the spring increases substantially, therefore the spring must be made of a thicker wire. High rigidity of the spring increases bending stress of the crank, causing an increase in the crank dimensions. Through this the unsuspended mass of the axle is increased with negative consequences to controlling comfort. None of these solutions remedies the basic problem, which is the loss of adhesion and thus loss of the propulsive effect of the axle in an area of maximum extension of the spring and damping unit, when the force produced by the spring is the smallest. In the contrary situation of a minimum length of the spring and damping unit the forces transferred into the structure of vehicle are extremely great and require a huge dimensioning of the adjacent parts of vehicle.

The goal of the invention is to eliminate or at least reduce shortcomings of the background art, first of all through the structural arrangement to better use the possibilities, which are provided by the spring for suspension of a vehicle.

PRINCIPLE OF THE INVENTION

The goal of the invention has been achieved by a suspension of a vehicle wheel comprising a helical spring, whose principle consists in that, one end of the spring is coupled with a moveable member of the wheel suspension, and the second end of the spring is coupled with a controlled member of a rolling kinematic couple, whose rolling surface engages with a convex rolling surface of a controlling member of the rolling kinematic couple, which is mounted on a basic member of the wheel suspension.

The moveable member is for example a crank of a crank suspension or a lower arm of a parallelogram suspension, wherein the basic member, as a rule, is connected with the vehicle chassis. This arrangement simplifies the structure of the moveable member, and at the same time mounting of the controlling member of the rolling kinematic couple on the basic member, which in this case is substantially immovable, is simple as well.

The goal of the invention has also been achieved by a suspension of a vehicle wheel comprising a helical spring, whose principle consists in that, one end of the spring is coupled with a basic member of the wheel suspension and the second end of the spring is coupled with a controlled member of a rolling kinematic couple, whose rolling surface engages with a convex rolling surface of a controlling member of the rolling kinematic couple, which is mounted on a moveable member of the wheel suspension.

This solution reduces the unsuspended mass of the vehicle and simultaneously reduces the demand for space. Preferably, the moveable member is the crank of the crank suspension.

The controlling member of the rolling kinematic couple is fixedly mounted on the basic or moveable member of the wheel suspension, which is simple from the design point of view.

The controlling member of the rolling kinematic couple in an alternative embodiment is movably mounted on the basic or moveable member, through which a greater travel of the wheel with respect to the vehicle chassis is achieved.

In case of a movably mounted controlling member of the rolling kinematic couple it is advantageous, if this controlling member is coupled with another member of the wheel suspension, to derive its motion with respect to the member of the suspension, on which the controlling member is mounted. It is especially advantageous, if for this purpose it is coupled with individual propulsion. Through a controlled motion of the controlling member of the rolling kinematic couple there may be achieved an optimum course of spring compression, by means of which either the vehicle spring suspension for various types of driving surfaces may be adjusted, or continuously during driving the suspended parts of the vehicle may be maintained in the desired stabilised position.

Preferably, in the sophisticated embodiment, the individual propulsion serving to derive motion of the controlling member of the rolling kinematic couple is controlled by a system of automatic control of stabilised position of the vehicle parts coupled with the basic member. This enables maintaining a stable, usually horizontal position of the vehicle chassis.

The controlled member of the rolling kinematic couple is a rack bar, whose rolling surface engages with a convex rolling surface of the controlling member of the rolling kinematic couple, wherein the convex rolling surface is a toothed surface. In this case the controlling member is a tooth wheel or at least its segment.

It is also preferred, if the controlled member of the rolling kinematic couple is a flexible member, whose rolling surface engages with a convex rolling surface of the controlling member of the rolling kinematic couple, that the shape of the convex rolling surface corresponds to the shape of the corresponding rolling surface of the flexible member, and the flexible member is attached with its end to the convex rolling surface of the controlling member.

Upon motion of the moveable member of the suspension with respect to the member on which it is mounted, the flexible member is wound on the convex rolling surface of the controlling member, which reduces demand for installation space of the suspension.

It is also preferred, that mutually tangential positions of the rolling surface of the controlled member of the rolling kinematic couple and the convex rolling surface of the controlling member of the rolling kinematic couple be ensured through linear guidance. This, especially in some embodiments, enables geometrically perfect engagement of the controlling and controlled members of the rolling kinematic couple.

The principle advantage of the solution according to the invention is increase in travel of the vehicle wheel, while preserving the adhesion without increasing the structural length of the spring due to interaction of members of the wheel suspension mechanism with the rolling kinematic couple. Through a suitable shaping and propulsion of the controlling member of the rolling kinematic couple the controlled compression of the spring may be secured, and thus also controlled characteristics of great displacements of the suspended wheel during driving over a rough terrain. In most embodiments the suspension is of a compact, technologically advantageous shape with minimum demand for installation space and the forces which the suspension exerts on the vehicle chassis are concentrated into sufficiently dimensioned parts of the vehicle.

DESCRIPTION OF THE DRAWINGS

Exemplary embodiments of arrangements of the vehicle wheel suspension and its springs are schematically represented in the drawings where the figures "a" represent the suspension position before the wheel drives over the elevation of the driving surface, and the figures "b" represent the suspension position at the moment when the wheel is on the elevation of the driving surface, wherein the travel of the driving wheel is marked with reference symbols "H1" to "H7".

EXAMPLES OF EMBODIMENTS

Figure 2A:
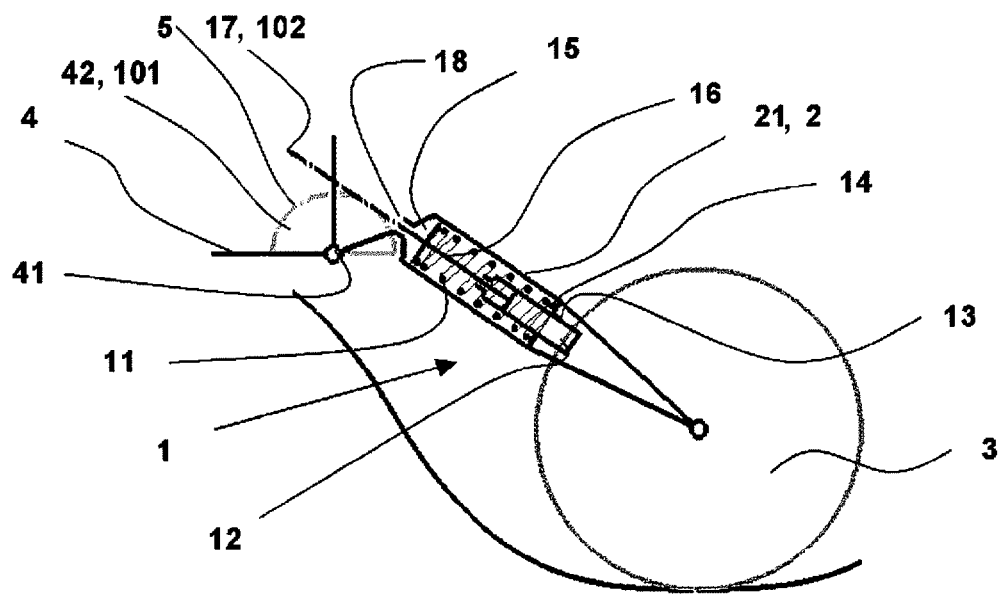
FIGS. 2a and 2b represent a crank suspension with a spring and damping unit coupled with a rack (toothed bar) in a function of a controlled member of a rolling kinematic couple and a non-moveable toothed segment in a function of a controlling member of the rolling kinematic couple.
Figure 2B:
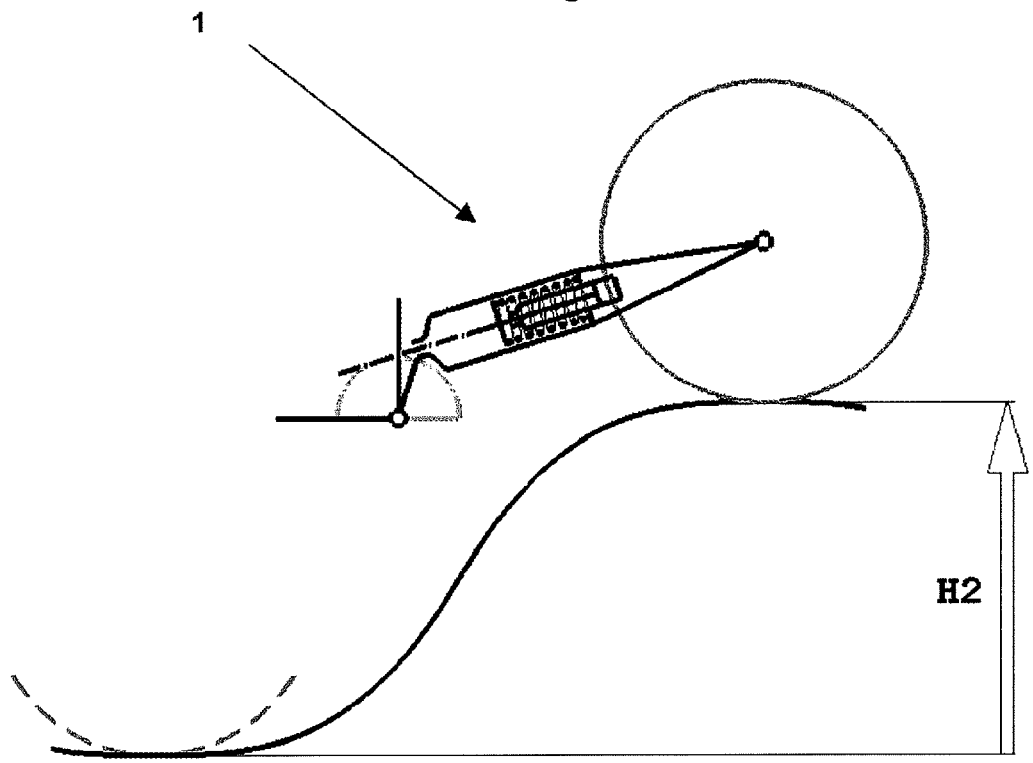

FIGS. 2a, 2b show an exemplary embodiment of the invention for the crank suspension of a rear rigid axle of an off-road vehicle, or ATV quadricycle or for a suspension of a rear wheel for a terrain motorcycle.

The spring-loaded crank suspension 1 comprises a moveable member 2 formed of a body 21, which on one of its ends carries a shaft of controlling wheel 3 and with its second end is rotatably mounted on a basic member 4 at an axis 41. Inside the body 21 there is mounted a spring and damping unit formed of a compression helical spring 11 and of a fluid shock absorber 12 arranged coaxially with the spring 11, while the cylinder 13 of the fluid shock absorber 12 is connected with the body 21. The compression helical spring 11 and its end adjacent to the wheel 3 rests against the fixed support 14 attached to the body 21 of the movable member 2. The second end of the spring 11 is in contact with the shifting support 15. The shifting support 15 is in a fixed manner connected with the piston rod 16 of the fluid shock absorber 12. The piston rod 16 is in a fixed manner connected with a rack 17 which is in a sliding manner mounted in the linear guidance 18 in the body 21 of the moveable member 2. On the basic member 4 the gear segment 42 is mounted in a fixed manner, the axis of gear segment 42 being identical with the axis 41 of rotation of the body 21 around the basic member 4. The rack 17 engages with its gearing the gearing of the gear segment 42.

The gear segment 42 functioning as a controlling member 101 and the rack 17 functioning as a controlled member 102 form a rolling kinematic couple, wherein the gearing of the gear segment 42 represents its convex rolling surface 5.

In a position of the wheel 3 before a protruding terrain unevenness the spring 11 is of maximum or nearly maximum length, and the shifting support 15 together with the piston rod 16 of fluid shock absorber 12 and the rack 17 in the body 21 is in the vicinity of an extreme position on the side adjacent to the basic member 4. Upon driving of the wheel 3 up a bump having height H2, the wheel 3 due to a generated reaction force is pressed in a direction upwards and it is displaced over a vertical distance H2 with respect to the basic member 4. At the same time the rack 17 rolls along the gear segment 42 and simultaneously inserts the piston rod 16 of the fluid shock absorber 12 into cylinder 13 of the fluid shock absorber 12 and by means of the shifting support 15 compresses the spring 11. The force of the spring 11 increases until the moment of balance in dynamic force on the body 21. The dependence of the force of the spring 11 on an angular position of the body 21 of the movable member 2 is uniquely given by characteristics of the spring 11 and by the kinematic dependence of the axial position of the rack 17 on the angular position of the body 21. This dependence may be determined from the force transmission of the rolling kinematic couple, whose controlling member 101 is the gear segment 42 and whose controlled member 102 is the rack 17.

In a not represented embodiment the gear segment 42 and the rack 17 may be superseded by a segment of chain wheel and a two-way load carrying chain, wherein the linear guidance 18 is modified in an appropriate manner. With its free end the chain is attached to the segment of a chain wheel, by engagement with the convex rolling surface of the chain wheel. The advantage of this alternative consists in that, the chain is partially wound on the circumference of the chain wheel segment and the solution does not require space in the basic member 4, into which extends the end of the rack 17 in the represented embodiment.

Figure 1A:
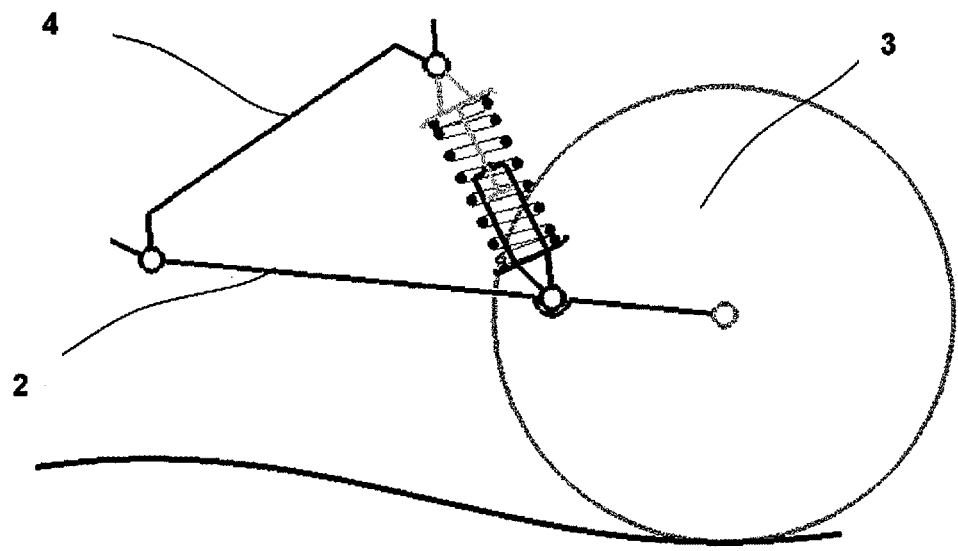
FIGS. 1a and 1b represent the structure of a crank suspension according to the background art, further figures representing alternative embodiments according to the invention.
Figure 1B:
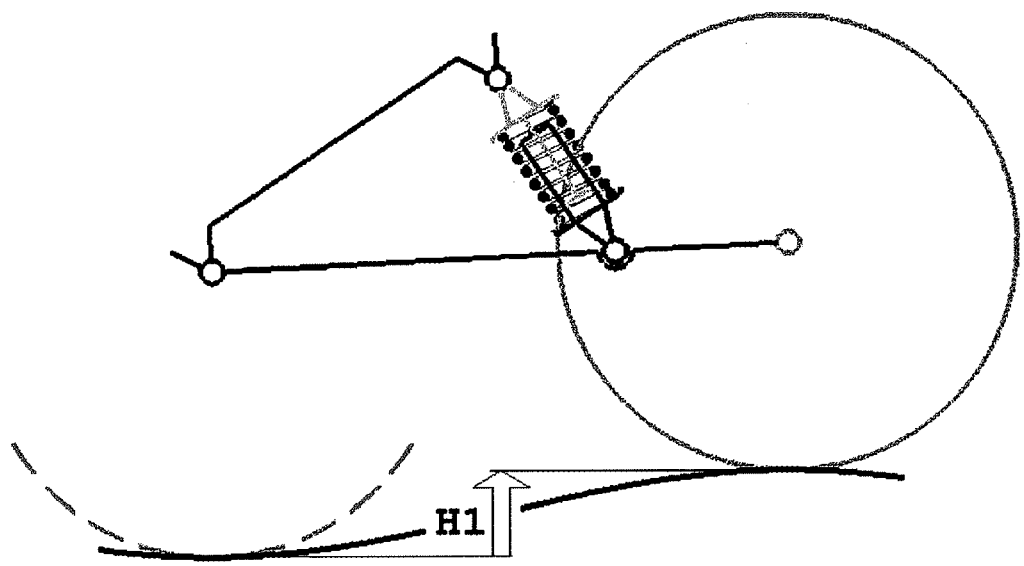

At the same compression of springs of the spring and damping unit are achieved the travels H1, H2 of the wheel 3 initiated by various heights of unevenness of the driving surface. Comparison of the embodiment according to the background art (travel H1, FIG. 1a, 1b) and the embodiment according to the invention (for example travel H2, FIG. 2a, 2b) indicates an obvious advantage of the new solution. A higher travel H2 of the wheel 3 is achieved, without necessity to install an inadequate long spring between the moveable member 2 forming a crank of the suspension and the basic member 4.

Figure 3A:
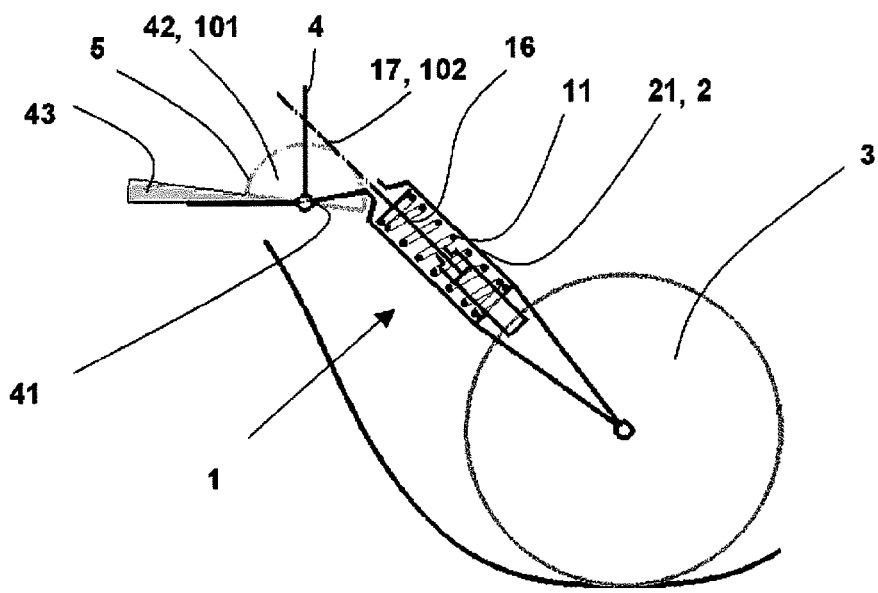
FIGS. 3a and 3b represent a crank suspension with a spring and damping unit coupled with a rack and a moveable toothed segment.
Figure 3B:
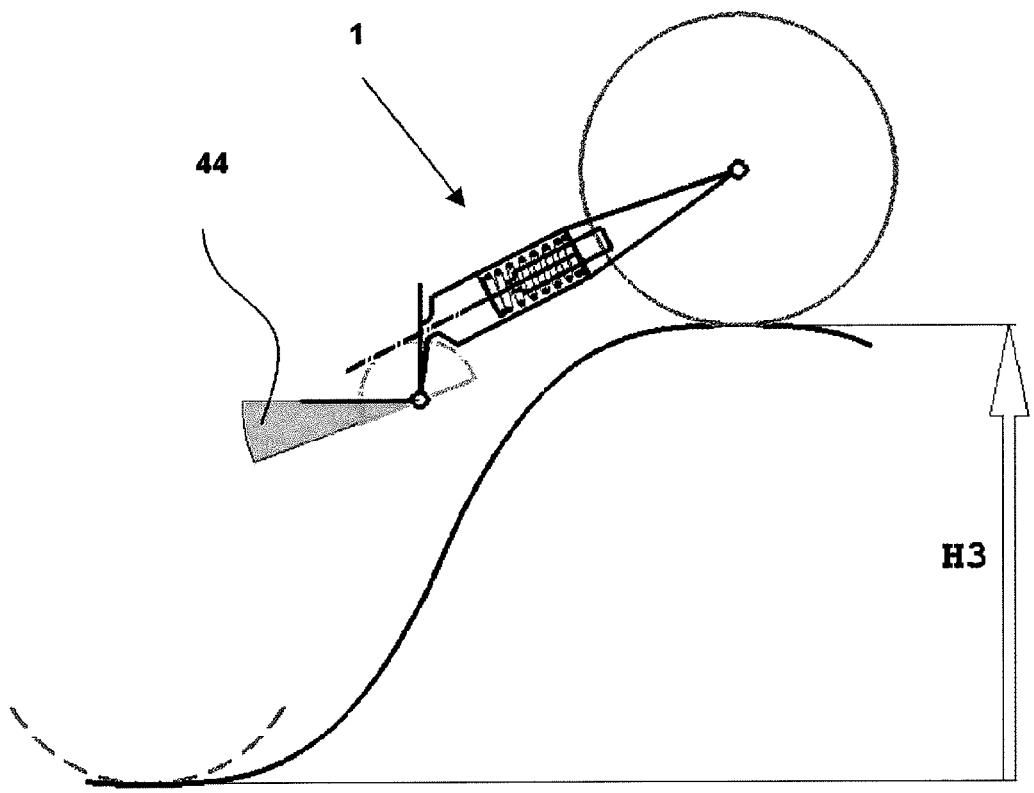

The arrangement represented in FIG. 3a, 3b is a modification of the described embodiment. The gear segment 42 of the controlling member 101 is here mounted rotatably around the axis 41 about which the body 21 of the moveable member 2 is rotatably mounted on the basic member 4 and it may turn e.g. within the range given by the total sum of dark sectors 43, 44 represented in the drawings. Upon driving of the wheel 3 onto an elevation the gear segment 42 is forced to turn in the same direction as the body 21 of the moveable member 2 of the spring-loaded crank suspension 1, by which rotation of the gear segment 42 at the same compression of the spring 11 a travel H3 of the wheel 3 higher than the travel H2 from FIG. 2b is achieved. This motion of the gear segment 42 may be coupled in a not represented manner with an angular travel of the body 21 of the moveable member 2 with respect to the basic member 4, or it may be generated by a not represented individual motoric propulsion. In a more advanced embodiment this propulsion is controlled by a not represented automatic control system of stabilised position of the basic member 4.

Also in this embodiment the gear segment 42 performs the function of a controlling member 101 and the rack 17 performs the function of a controlled member 102 of the rolling kinematic couple, while gearing of the segment 42 represents its convex rolling surface 5.

Figure 4A:
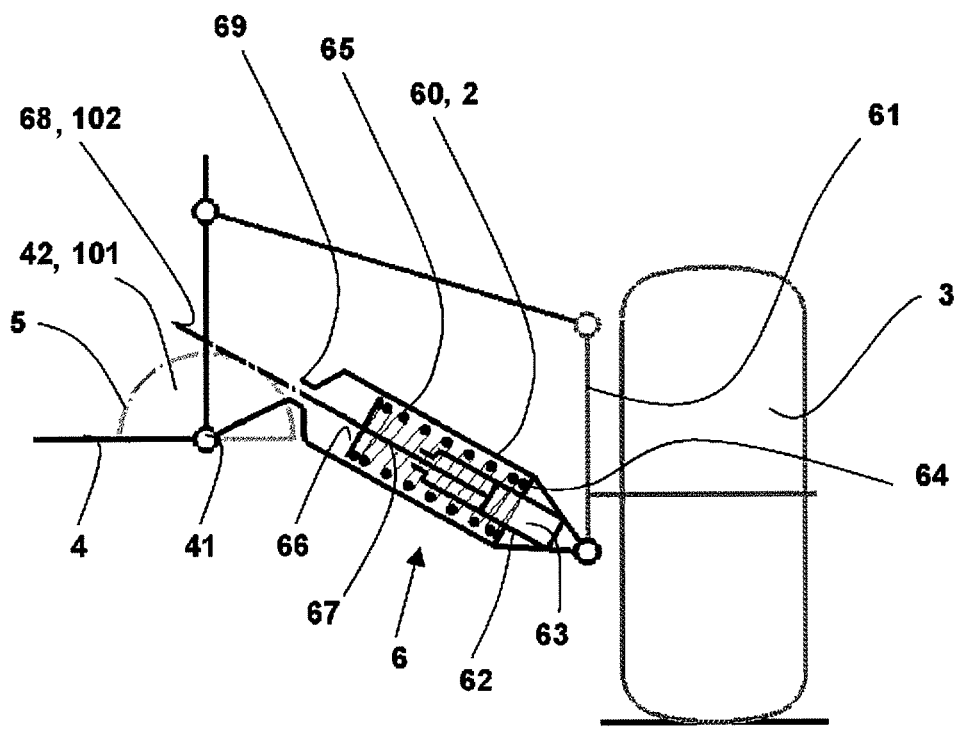
FIGS. 4a and 4b represent a parallelogram suspension with a spring and damping unit coupled with a rack and an immovable toothed segment.
Figure 4B:
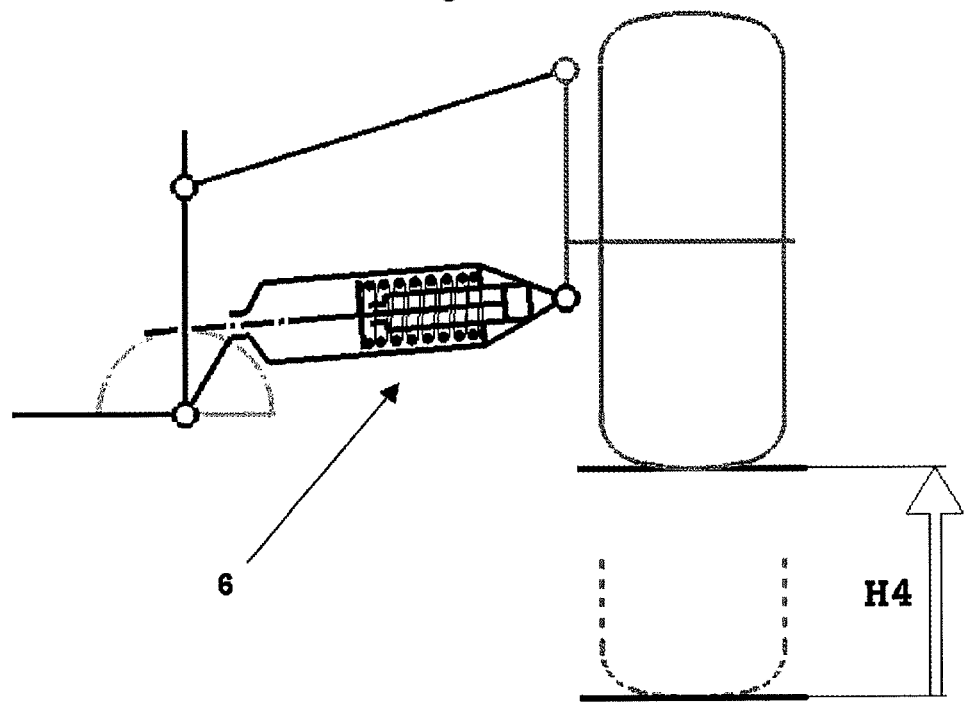

The applicability of this invention is not limited to cranked suspensions of the driving wheels only. FIGS. 4a, 4b represent an alternative parallelogram suspension 6, whose lower spring-loaded arm is a moveable member 2 of the suspension mechanism, which corresponds to the above described spring-loaded crank suspension 1. The moveable member 2 is formed of a body 60, which by its one end is connected in an articulated manner to a pitman 61, which carries the wheel 3 and its accessories. By its second end the body 60 is in an articulated manner connected to the basic member 4. Inside the body 60 there are a cylinder 62 of a fluid shock absorber 63 and a fixed support 64 which are connected to the body 60. One end of a compression helical spring 65, arranged coaxially with the cylinder 62 of the fluid shock absorber 63, rests against the fixed support 64. The second end of the spring 65 is in contact with the shifting support 66, the shifting support 66 being fixedly connected with a piston rod 67 of the fluid shock absorber 63. The piston rod 67 of the fluid shock absorber 63 is also fixedly connected with a rack 68 performing the function of a controlled member 102, the rack 68 being in a shifting manner mounted in the linear guidance 69 in the body 60 of moveable member 2. On the basic member 4 in the rotation axis 41 of the rotatable mounting of the body 60 of the moveable member 2 there is mounted a fixed or rotating gear segment 42 performing the function of a controlling member 101, the rack 68 being in engagement with gearing of the gear segment 42.

The functioning of embodiment according to FIGS. 4a, 4b corresponds to the above mentioned described device represented in FIGS. 2a, 2b for the immovable gear segment 42, and in FIGS. 3a, 3b for the moveable gear segment 42. The gear segment 42 as a controlling member 101 and the rack 68 as a controlled member 102 create a rolling kinematic couple, wherein the gearing of the gear segment 42 is its convex rolling surface 5.

Figure 5A:
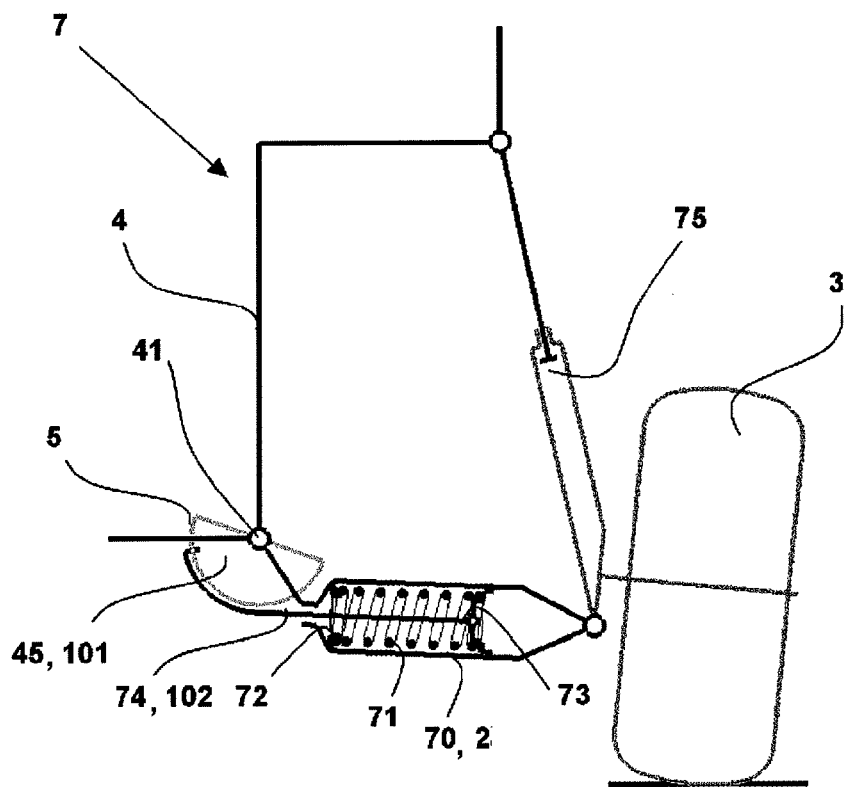
FIGS. 5a and 5b represent a McPherson axle suspension with a spring unit coupled with one end of a flexible controlled member of a rolling kinematic couple, whose second end is attached to a cylindrical rolling surface of a controlling member of the rolling kinematic couple, on which the flexible controlled member is wound during operation of the spring unit.
Figure 5B:
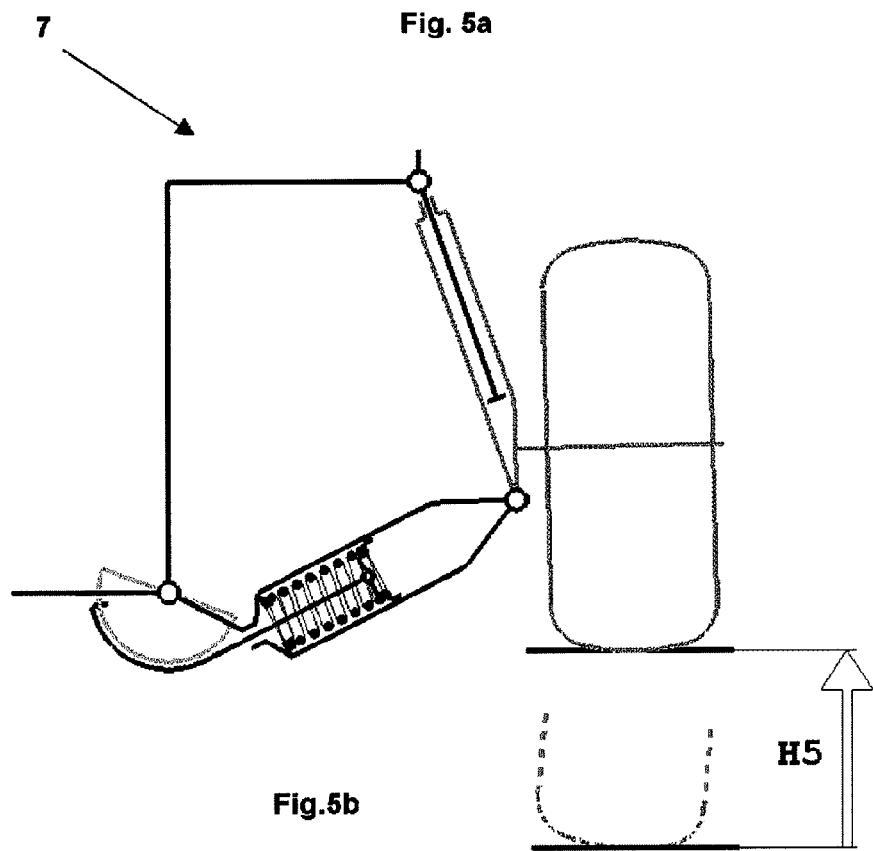

FIGS. 5a, 5b represent an exemplary embodiment of the invention with a suspension 7 of McPherson type with a lower spring-loaded arm 2 formed of a body 70, in which there is positioned a compression helical spring 71 resting with its end adjacent to a basic member 4 against a fixed through support 72. The second end of the compression helical spring 71, adjacent to the wheel 3, is in contact with the shifting support 73, to which there is attached one end of a rope 74, passing through the cavity of the compression helical spring 71. With its second end the rope 74 is attached to a cylindrical rolling surface 5 of a segment 45, on which segment 45 the rope 74 is wound upon motion of the wheel 3 upwards.

The segment 45 here fulfils the function of a controlling member 101 of a rolling kinematic couple, and the rope 74 fulfils the function of a controlled member 102 of the rolling kinematic couple, while the cylindrical surface of the segment 45 is the convex rolling surface 5.

The segment 45 is firmly connected with the basic member 4. Damping of suspension motion in this embodiment is secured by means of a fluid shock absorber 75, which is an individual member of the suspension mechanism 7. In this embodiment the fluid shock absorber 75 must be relatively long, so as to cover the whole range H5 of axle travel.

In a not represented embodiment instead of the compression helical spring 71 a draw helical spring is used, which with the end adjacent to the wheel 3 is attached to the body 70 of lower spring-loaded arm 2 and with the second end is attached directly to the rope 74, the controlled member 102, which is being wound on the cylindrical rolling surface 5 of the segment 45, the controlling member 101.

In alternative embodiments of the rolling kinematic couple a flexible controlled member 102, for example, a roller chain, flat belt, vee-belt, or toothed belt, is used. Segment 45, the controlling member 101, is then provided with a respective convex rolling surface 5 formed of a rolling surface of the chain wheel, or of a rolling surface of a flat belt, vee-belt or toothed belt. Segment 45 may be mounted on the basic member 4 rotatably with forced rotation motion, similarly to the embodiments represented in FIGS. 3a, 3b, 4a, 4b.

Figure 6A:
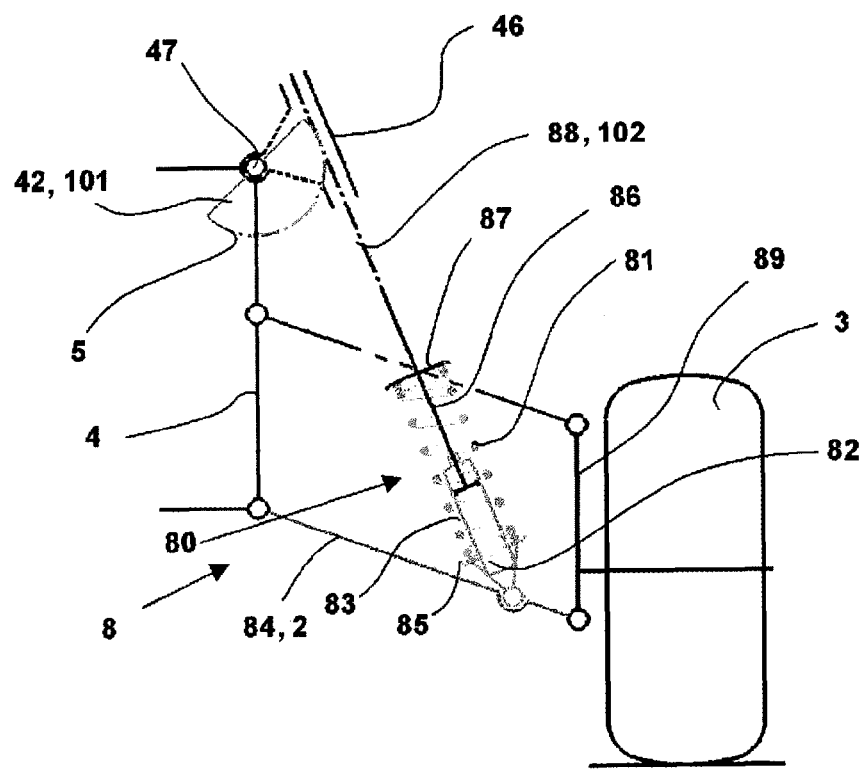
FIGS. 6a and 6b represent a parallelogram suspension with a spring and damping unit coupled with a rack and a moveable toothed segment mounted on a basic member outside a swing axis of suspension arms.
Figure 6B:
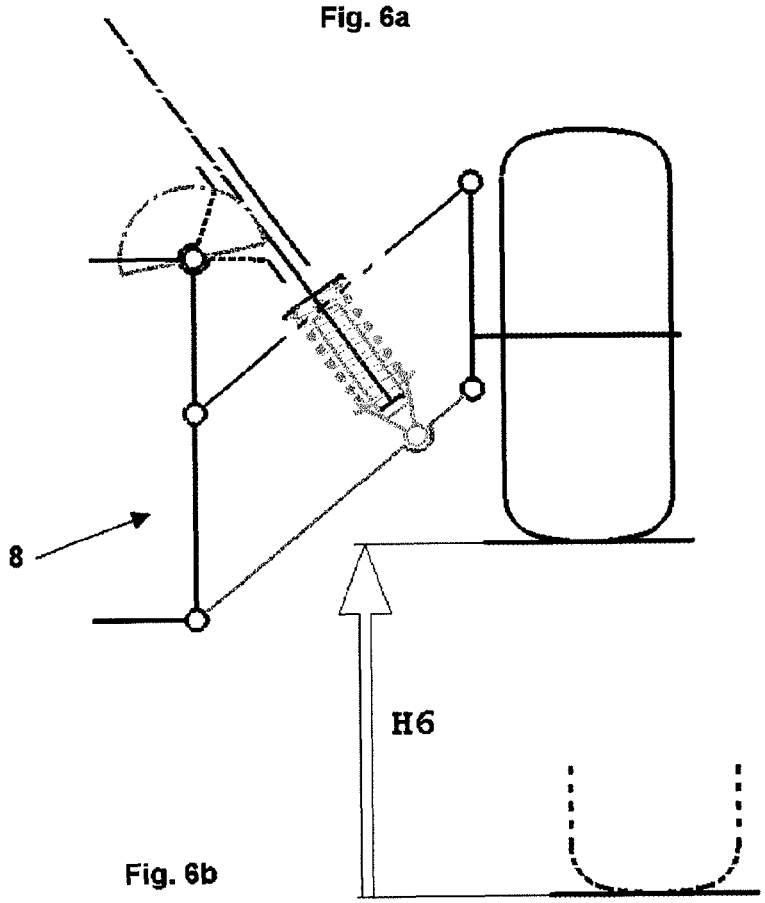

A parallelogram suspension 8 of a wheel 3 represented in FIGS. 6a, 6b is another alternative of embodiment according to the invention. Here, the spring and damping unit 80 is not directly a member of the kinematic mechanism of the suspension 8, but it is arranged separately. The spring and damping unit 80 comprises the compression helical spring 81, inside of which there is arranged the fluid shock absorber 82. In the exemplary embodiment the cylinder 83 of the fluid shock absorber 82 with its blind end is in an articulated manner connected with the lower arm 84 of the parallelogram suspension 8 of the wheel 3. On cylinder 83 of the fluid shock absorber 82 the fixed support 85 of the spring 81 is attached. Piston rod 86 of the fluid shock absorber 82 is firmly connected with the shifting support 87 of the spring 81 and its extended section creates a rack 88, which is the controlled member 102 of a rolling kinematic couple. The compression helical spring 81 is inserted between the fixed support 85 and the shifting support 87. The rack 88 engages with gearing of the gear segment 42, which is the controlling member 101 of the rolling kinematic couple, the gear segment 42 being mounted rotatably or in a not represented embodiment in a fixed manner, on a basic member 4. The tangential position of the rack 88 towards the gear segment 42 is ensured by means of a linear guidance 46, which is mounted rotatably on the basic member 4 and coaxially with rotational axis 47 of the gear segment 42.

The controlling member 101 of the rolling kinematic couple is represented by the gear segment 42, and the controlled member 102 of the rolling kinematic couple is represented by the rack 88, while the convex rolling surface 5 is formed by the rolling surface of gearing of the gear segment 42.

Alternatively, the blind end of the cylinder 83 of the fluid shock absorber 82, instead of being connected with the lower arm 84 of the suspension 8, may be connected, in a not represented manner, for example with the pitman 89 of parallelogram suspension 8 of the wheel 3.

Figure 7A:
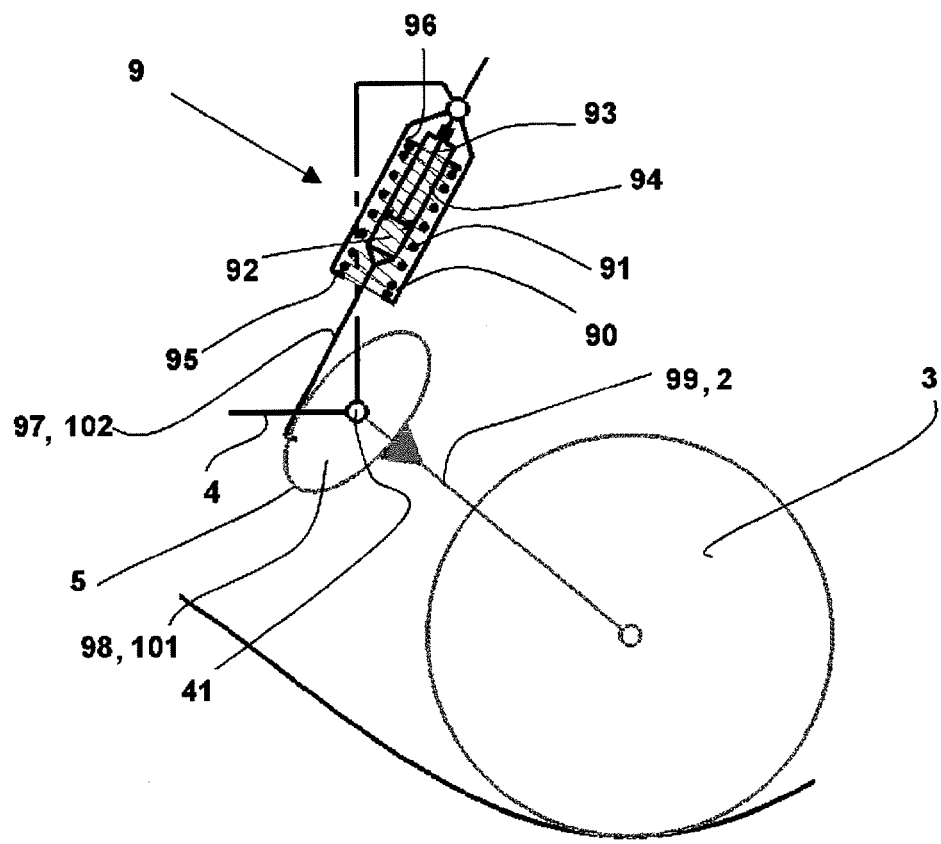
FIGS. 7a and 7b represent a crank suspension with a spring and damping unit anchored on a basic member and coupled with one end of a flexible controlled member of a rolling kinematic couple, whose second end is connected with a controlling member of the rolling kinematic couple, to whose rolling surface with a non-constant diameter of curve the flexible controlled member is wound during operation of the spring and damping unit, while the controlling member of the rolling kinematic couple is immovably mounted on the crank of the suspension.
Figure 7B:
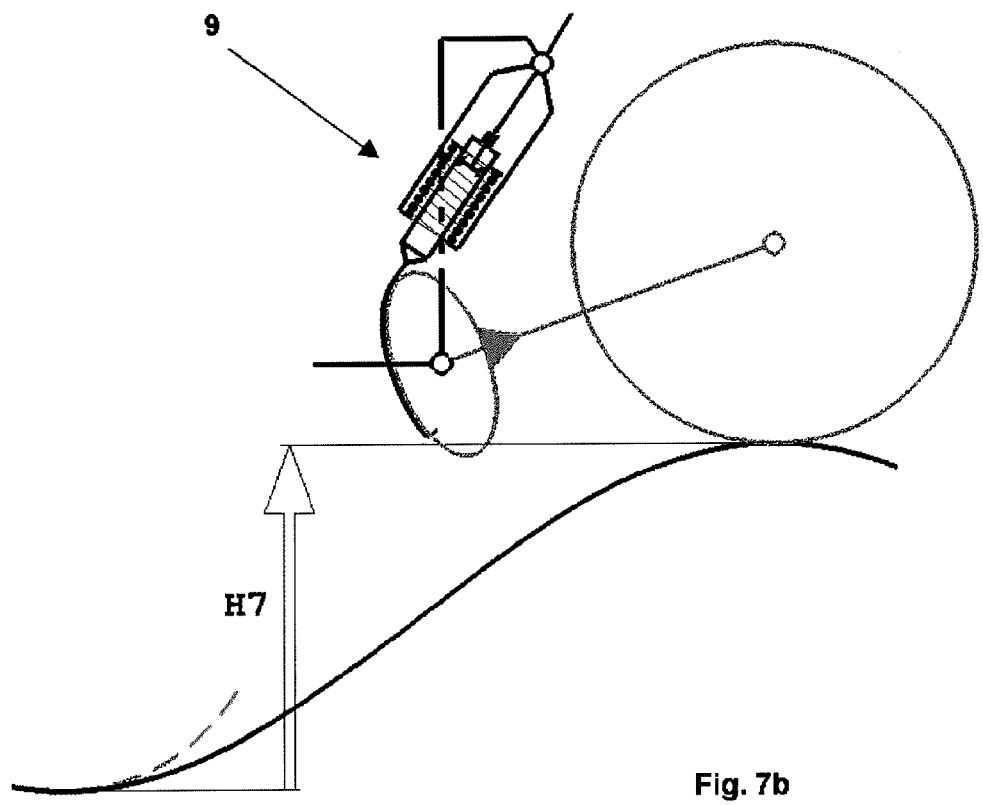

FIGS. 7a, 7b represent a crank suspension 9 of a wheel 3 of a vehicle with moveable member 2 formed of a crank 99, which comprises a spring suspension mounted in a body 90. The body 90 with one end is connected with a basic member 4 in an articulated manner. The compression helical spring 91 and the fluid shock absorber 92 are axially mounted inside the body 90. The end of the piston rod 93 of the fluid shock absorber 92 is fixedly connected with the body 90 in place of its connection to a basic member 4. Cylinder 94 of the fluid shock absorber 92 is in a shifting manner mounted on its piston rod 93. The second end of a body 90 forms a fixed support 95 of the compression helical spring 91. The moveable support 96 of the compression helical spring 91 is fixedly connected with the moveable cylinder 94 of the fluid shock absorber 92, so that the compression helical spring 91 together with the moveable cylinder 94 moves towards the body 90. To the blind end of cylinder 94 of the fluid shock absorber 92 with its one end there is connected a rope 97 forming a controlled member 102 of a rolling kinematic couple, which rope 97 with its second end is attached to the curved circumferential surface of the rounded body 98 forming a controlling member 101 of the rolling kinematic couple. In the exemplary embodiment the convex rolling surface 5 of the rounded body 98 is of an elliptic shape and the rounded body 98 is connected in a fixed manner to the moveable member 2 formed of the crank 99 of the crank suspension 9.

In not represented embodiments the convex rolling surface 5 of the rounded body 98 is of another suitable shape and the rounded body 98 is mounted on the crank 99 in a not moveable manner and in another suitable position or rotatably with its axis either at the swinging axis 41 of the crank 99, or even outside of it.

In alternative embodiments of the rolling kinematic couple a roller chain, or flat belt, vee-belt or toothed belt is used as a controlled member 102. The controlling member 101 is then provided with a respective convex rolling surface 5 formed of a rolling surface of the chain wheel, or of a rolling surface of the flat belt, vee-belt or toothed belt.

The rounded body 98 forming the controlling member 101 of the rolling kinematic couple may in another not represented embodiment be realised by means of a gear segment, and the controlled member 102 by a rack, while the linear guidance of the rack similar to the embodiment represented in FIGS. 6a, 6b is used. In a case, where the gear segment is circular and its axis lies at a rotational axis of the crank 99 the linear guidance may be immovable with respect to the basic member 4.

The rounded body 98 functioning as a controlling member 101 and the rope 97 functioning as a controlled member 102 form a rolling kinematic couple, wherein the circumferential surface of the rounded body 98 is its convex rolling surface 5. Similarly to the moveable segments of previous embodiments the rotatably mounted rounded body 98 may as a controlling member 101 of the suspension 9 move with respect to the moveable member 2, which is derived e.g. from a motion of the moveable member 2 with respect to the basic member 4 by means of a not represented coupling, or motion of the rounded body 98 may be produced by individual propulsion of the rounded body 98.

A noncircular, in the exemplary embodiment, an elliptic, convex rolling surface 5 enables a variable gear ratio between angular travel of the moveable member 2 and compression of the spring 91. Through this the course of travel characteristics of the crank suspension 9 of the wheel 3 may be affected in a suitable manner.

The advantage of suspensions of a wheel 3 of a vehicle for driving in rough terrain in suspension embodiments 1, 6, 7, 8, 9 according to the invention consists in that it enables a great vertical travel of driving wheels of a vehicle during driving in such terrain, while relatively short springs of a spring suspension of the vehicle may be used. This reduces the demand for space to install the suspension, while the forces transferred from the suspension to the basic member 4 are acting in places which are sufficiently dimensioned.

Through a suitable shaping of the convex rolling surface 5 on the controlling member 101 of the rolling kinematic couple, the travel characteristics of the vehicle spring suspension may be affected positively in a broad range.

If the controlling member 101 of the kinematic couple provided with a convex rolling surface 5 is equipped with its own propulsion, it may be with advantage used as an active member of an automatic stability controlling system of the basic member 4 of the vehicle and the connected superstructures.

The technological point of view is important as well. The suspensions of vehicle wheels, in embodiments according to the invention mostly create compact installation assemblies, which are installed into a vehicle with simultaneous saving of installation time.

The invention claimed is:

1. A suspension of a wheel of a vehicle, comprising a basic member formed by a part of a vehicle chassis, a moveable member formed by a swinging arm of the suspension of the wheel, and a helical spring;
   the suspension further comprises a rolling kinematic couple, the rolling kinematic couple having a controlled member formed by a first elongated body, the first elongated body having a rolling surface engaging with a convex rolling surface of a controlling member of the rolling kinematic couple, the convex rolling surface being mounted on the basic member of the suspension of the wheel and;
   one end of the helical spring is coupled with the moveable member of the suspension of the wheel, and a second end of the helical spring is coupled with the controlled member of the rolling kinematic couple, the helical spring being mounted inside a second elongated body, the controlled member extending from one end of the second elongated body.

2. A suspension of a wheel of a vehicle, comprising a basic member formed by a part of a vehicle chassis, a moveable member formed by a swinging arm of the suspension of the wheel, and a helical spring;
   the suspension further comprises a rolling kinematic couple, the rolling kinematic couple having a controlled member formed by a first elongated body, the first elongated body having a rolling surface engaging with a convex rolling surface of a controlling member of the rolling kinematic couple, the convex rolling surface being mounted on the moveable member of the suspension of the wheel; and
   one end of the helical spring is coupled with the basic member of the suspension of the wheel, and the second end of the helical spring is coupled with the controlled member of the rolling kinematic couple, the helical spring being mounted inside a second elongated body, the controlled member extending from one end of the second elongated body.

3. The suspension according to claim 1, wherein the controlling member of the rolling kinematic couple is fixedly mounted on the basic member of the suspension.

4. The suspension according to claim 1, wherein the controlling member of the rolling kinematic couple is movably mounted on the basic member of the suspension.

5. The suspension according to claim 2, wherein the controlling member of the rolling kinematic couple is fixedly mounted on the moveable member of the suspension.

6. The suspension according to claim 2, wherein the controlling member of the rolling kinematic couple is movably mounted on the moveable member of the suspension.

7. The suspension according to claim 4, wherein the controlling member of the rolling kinematic couple is coupled with another member of the suspension of the wheel for generating its motion with respect to the basic member of the suspension.

8. The suspension according to claim 4, wherein the controlling member of the rolling kinematic couple is coupled with individual propulsion serving to generate its motion with respect to the basic member of the suspension.

9. The suspension according to claim 8, wherein the individual propulsion serving to generate motion of the controlling member of the rolling kinematic couple is controlled by a system of automatic control of stabilised position of vehicle parts coupled with the basic member.

10. The suspension according to claim 1, wherein the controlled member of the rolling kinematic couple is a rack, a rolling surface of the rack engages with the convex rolling surface of the controlling member of the rolling kinematic couple, wherein the convex rolling surface is a toothed surface.

11. The suspension according to claim 1, wherein the controlled member of the rolling kinematic couple is a flexible member, the flexible member having a rolling surface engaging with the convex rolling surface of the controlling member of the rolling kinematic couple, wherein a surface shape corresponding to the convex rolling surface corresponds to a surface shape corresponding to the rolling surface of the flexible member and the flexible member with its end is attached to the convex rolling surface of the controlling member.

12. The suspension according to claim 10, wherein mutual tangential positions of the rolling surface of the controlled member of the rolling kinematic couple and of the convex rolling surface of the controlling member of the rolling kinematic couple are secured through a linear guidance.

13. The suspension according to claim 6, wherein the controlling member of the rolling kinematic couple is coupled with another member of the suspension of the wheel for generating motion of the controlling member with respect to the moveable member of the suspension.

14. The suspension according to claim 6, wherein the controlling member of the rolling kinematic couple is coupled with individual propulsion serving to generate motion of the controlling member with respect to the moveable member of the suspension.

15. The suspension according to claim 14, wherein the individual propulsion serving to generate motion of the controlling member of the rolling kinematic couple is controlled by a system of automatic control of stabilised position of vehicle parts coupled with the basic member.

16. The suspension according to claim 11, wherein mutual tangential positions of the rolling surface of the controlled member of the rolling kinematic couple and of the convex rolling surface of the controlling member of the rolling kinematic couple are secured through a linear guidance.

17. The suspension according to claim 1, wherein the moveable member is formed by the second elongated body.

18. The suspension according to claim 1, wherein the second elongated body is moveable.

19. The suspension according to claim 2, wherein the second elongated body is moveable.

20. A suspension of a wheel of a vehicle, comprising a basic member formed by a part of a vehicle chassis, a moveable member formed by a swinging arm of the suspension of the wheel, and a helical spring;

the suspension further comprises a rolling kinematic couple, the rolling kinematic couple having a controlled member formed by an elongated body, the elongated body having a rolling surface engaging with a convex rolling surface of a controlling member of the rolling kinematic couple, the controlling member is mounted on the basic member of the suspension of the wheel; and one end of the helical spring is coupled with the moveable member of the suspension of the wheel, and a second end of the helical spring is coupled with the controlled member of the rolling kinematic couple, the helical spring being inserted between a fixed support of the helical spring and a shifting support of the helical spring, the controlled member extending from the shifting support and extending away from the helical spring.

\* \* \* \* \*